W. H. Colley,

Lounge.

No. 4,275. Reissued Feb. 21, 1871.

Witnesses:
John. Becker
Thomas D. D. Lindsley

Inventors.
Jas. Seymour, Wm. H. Coolidge, Chas. Stimson
Per Munn & Co
Attorneys.

N. PETERS, PHOTO-LITHOGRAPHER, WASHINGTON, D. C.

United States Patent Office.

JAMES SEYMOUR, ADMINISTRATOR, WILLIAM H. COOLIDGE, AND CHARLES STIMSON, OF LEAVENWORTH, KANSAS, ASSIGNEES OF WILLIAM H. COLLEY, DECEASED.

Letters Patent No. 103,301, dated May 24, 1870; reissue No. 4,275, dated February 21, 1871.

IMPROVEMENT IN BED-LOUNGES.

The Schedule referred to in these Letters Patent and making part of the same.

*To all whom it may concern:*

Be it known that WILLIAM H. COLLEY, of Leavenworth, in the county of Leavenworth and State of Kansas, invented a new and improved Lounge; and we do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
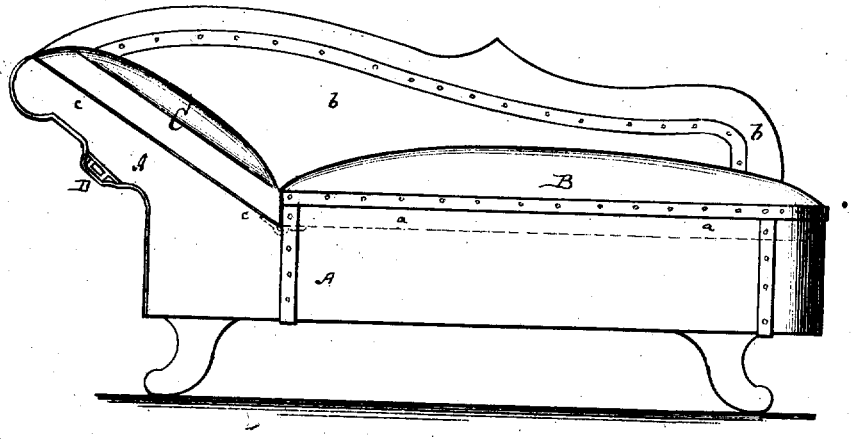
Figure 1 represents a side elevation of the improved lounge, showing it folded together.

The object of this invention is to so improve lounges that the head-rest of the lounge proper will also serve as a head-support for the bed.

The invention consists in hinging the upper part of the head-rest to the folding seat so that it will swing in or out with the same, and in thereby making the said head-rest part of the extension-bed.

A in the drawing represents the frame or fixed part of a lounge.

It consists of the fixed mattress or bed-bottom *a*, back *b*, and inclined but fixed head-rest *c*.

B is the hinged seat.

The same is hinged to the frame A in the ordinary or suitable manner, and can be swung upon the bed-bottom *a*, as in fig. 1, or away from the same, as may be desired.

The main head-rest C is hinged to the end of the folding seat B, and will, when the device is folded together, rest on the fixed rest *c*, as in fig. 1.

The upholstered upper surface will then constitute the main head-rest of the lounge.

Figure 2:
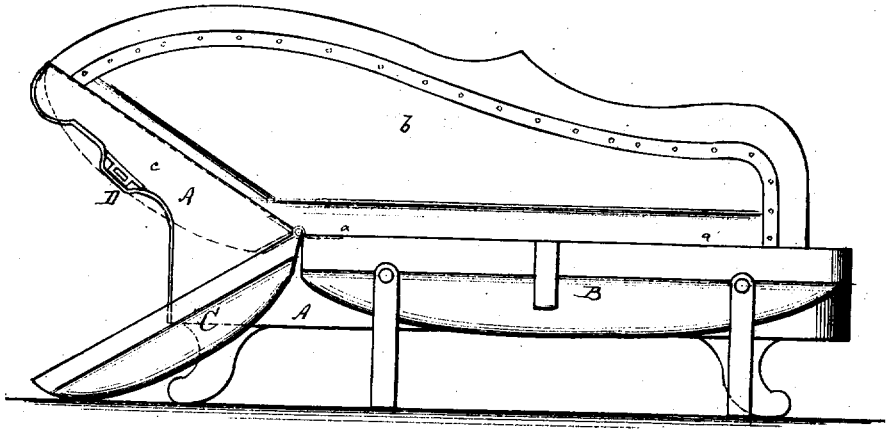
Figure 2 is a side elevation of the same.

When the seat B is swung out, as in fig. 2, the head-rest C will swing with it, and can be elevated into line with the rest *c*, as indicated by dotted lines in fig. 2.

A bolt, catch, or other fast[illegible] D, serves to lock the rest C in the last-named [illegible].

The head-rest will th[illegible]ous as the seats when the apparat[illegible] bed.

What we claim as the [illegible] WILLIAM H. COLLEY, deceased, and desi[illegible]ure by Letters Patent, is—

The frame A, having bottom, back [illegible]ined head-rest, all as described, combined [illegible]d seat and swinging head-rest, construc[illegible] arranged therewith to form an im[illegible]d lounge and bed, as shown and des[illegible]

JAMES SEY[illegible]
*As Administrator of the e[illegible]*
WM. H. COLL[illegible]*ceased.*
WILLIAM H. COOLIDGE,
CHARLES STIMSON.

Witnesses:
H. T. GREEN,
J. F. MILLER.